(12) United States Patent
Takagi et al.

(10) Patent No.: US 7,646,530 B2
(45) Date of Patent: Jan. 12, 2010

(54) PARTICLE AND DEVICE FOR IMAGE DISPLAY

(75) Inventors: Koji Takagi, Kawasaki (JP); Kazuya Murata, Kodaira (JP); Norio Nihei, Kodaira (JP); Gaku Yakushiji, Higashiyamato (JP); Hajime Kitano, Kodaira (JP); Yoshitomo Masuda, Hamura (JP); Takahiro Kawagoe, Tokorozawa (JP)

(73) Assignee: Bridgestone Corporation, Tokyo (JP)

( * ) Notice: Subject to any disclaimer, the term of this patent is extended or adjusted under 35 U.S.C. 154(b) by 734 days.

(21) Appl. No.: 10/512,421

(22) PCT Filed: Apr. 17, 2003

(86) PCT No.: PCT/JP03/04923

§ 371 (c)(1),
(2), (4) Date: Jul. 8, 2005

(87) PCT Pub. No.: WO03/091799

PCT Pub. Date: Nov. 6, 2003

(65) Prior Publication Data

US 2006/0087718 A1    Apr. 27, 2006

(30) Foreign Application Priority Data

Apr. 26, 2002 (JP) .............................. 2002-125605
Oct. 23, 2002 (JP) .............................. 2002-307765

(51) Int. Cl.
*G02B 26/00* (2006.01)
*G02B 26/08* (2006.01)
*G02F 1/29* (2006.01)

(52) U.S. Cl. .................. 359/296; 359/292; 359/298
(58) Field of Classification Search ................ 359/296, 359/290, 291, 292, 295, 298
See application file for complete search history.

(56) References Cited

U.S. PATENT DOCUMENTS

| 6,411,032 B1* | 6/2002 | Shiiki et al. .................. 313/582 |
| 6,760,086 B2* | 7/2004 | Hattori et al. ................ 349/122 |
| 2002/0044333 A1 | 4/2002 | Shigehiro et al. |
| 2002/1008232 | * 6/2002 | Chawla et al. .............. 524/203 |

FOREIGN PATENT DOCUMENTS

| JP | 05-173193 A | | 7/1993 |
| JP | 8-114947 A | | 5/1996 |
| JP | 2001-312225 | * | 9/2001 |
| JP | 2001-312225 A | | 11/2001 |
| JP | 2001-350162 A | | 12/2001 |

* cited by examiner

*Primary Examiner*—Ricky L Mack
*Assistant Examiner*—Brandi N Thomas
(74) *Attorney, Agent, or Firm*—Sughrue Mion, PLLC

(57) ABSTRACT

In particles for image displaying used in an image display device, in which one or more kind of particles are sealed between opposed substrates, at least one substrate being transparent, and, in which the particles are made to fly and move so as to display an image, each particle has a micro-irregularity at its surface. Moreover, in an image display device, in which one or more kind of particles are sealed between opposed substrates, at least one substrate being transparent, and, in which the particles, to which an electrostatic field produced by two kinds of electrodes having different potentials is applied, are made to fly and move so as to display an image, use is made of each particle having a micro-irregularity at its surface.

8 Claims, 3 Drawing Sheets

PARTICLE AND DEVICE FOR IMAGE DISPLAY

TECHNICAL FIELD

The present invention relates to an image display device, which comprises an image display panel enables to repeatedly display or delete images accompanied by flight and movement of particles utilizing Coulomb's force and so on.

BACKGROUND ART

As an image display device substitutable for liquid crystal display (LCD), image display devices with the use of technology such as an electrophoresis method, an electro-chromic method, a thermal method, dichroic-particles-rotary method are proposed.

As for these image display device, it is conceivable as inexpensive visual display device of the next generation from a merit having wide field of vision close to normal printed matter, having smaller consumption with LCD, spreading out to a display for portable device, and an electronic paper is expected.

Recently, electrophoresis method is proposed that microencapsulate dispersion liquid made up with dispersion particles and coloration solution and dispose the liquid between faced substrates. However, in the electrophoresis method, there is a problem that a response speed is slow by the reason of viscosity resistance because the particles migrate among the electrophoresis solution. Further, there is a problem of lacking imaging repetition stability, because particles with high specific gravity of titanium oxide is scattered within solution of low specific gravity, it is easy to subside, difficult to maintain a stability of dispersion state. Even in the case of microencapsulating, cell size is diminished to a microcapsule level in order to make it hard to appear, however, an essential problem was not overcome at all.

Besides the electrophoresis method using behavior in the solution, recently, a device without using the solution is proposed, in which two or more groups of particles having different colors and different charge characteristics are sealed between two substrates and the particles, to which an electrostatic field is applied, are made to fly and move so as to display an image. [The Imaging Society of Japan "Japan Hardcopy '99" (Jul. 21-23, 1999) Transaction Pages 249-252] Since this device is a dry type as opposed to the electrophoresis method, there is a merit such that a moving resistance of the particles is small and thus a response speed is fast.

The dry-type display device mentioned above has an operation mechanism such that a mixture of two kinds of the particles having different colors and different charge characteristics is sandwiched by electrode plates and an electric field is generated between the electrode plates by applying a voltage to the electrode plates, thereby flying the charged particles having different charge characteristics in a different direction to obtain a display element.

As to forces applied to the particles, there are an attraction force between the particles due to Coulomb' force, an imaging force with respect to the electrode panel, an intermolecular force, a liquid bridging force and a gravity.

When the force applying to the particles due to the electric field is larger than total forces mentioned above, the particle fly occurs.

In the case that an actual drive circuit in the image display device takes into consideration, it is preferred that the drive voltage is lowered. As a large factor for defining the drive voltage, there are mainly an intermolecular force and a liquid bridging force. If these factors are made to be lowered, a decrease of the drive voltage is instantly achieved. Therefore, it is very important to improve these characteristics.

Moreover, in order to obtain god operation properties, it is preferred that an electrostatic property is made to be higher to some extent. Therefore, it is another task to obtain the particles having an excellent electrostatic property. The electrostatic property of the particle itself for the image display is the most important factor when a force generated by applied electric field and an adhesion force between the particles or to the substrate are controlled. However, the electrostatic property of the particle is normally under control of a material of the particle itself, and thus it is difficult to control it accurately by the particle itself.

Further, in the case that fine particles are used in a display element, it is necessary to use white color particles and black color particles so as to make a contrast on color tone clear. Contrary to this, polymerized fine particles obtained from a general-purpose resin show an achromatic color, but, since they are fine particles, they look like a white color by an irregular reflection of light. However, in the case that they are used with the black particles in the image display device, a contrast ratio lacks and thus whiteness is decreased.

In order to improve the whiteness, there is a method such that white fine powders such as titanium oxide powders or zinc oxide powders are included in the particle. However, in the case that the white fine particles are to be included during a particle polymerization by means of a polymerized method, it is necessary to control a surface affinity by performing a coupling agent treatment with respect to the white fine powders, so that the white fine powders are included in the particle effectively. Therefore, the producing method becomes very complicated.

Further, in the case that the method mentioned above is utilized, it is normally difficult to control a particle size. For example, a method, such that the particles are produced by kneading, grinding and classifying a mixture of a main resin and white fine powders constituting the particle, is proposed. However, in this case, it is not possible to obtain the particles having a narrow particle size distribution if the classifying operation is not performed. Moreover, since a mechanical grinding is performed so as to obtain the fine particles, it is difficult to obtain the particles having a particle size of 8 μm or less even if the fine particles having a particle size under the above level are to be obtained.

DISCLOSURE OF INVENTION

The present invention is achieved by investigating the above problems and has for its object to provide a particle and device for an image display, which can achieve a low electrostatic property, sufficiently apply an electrostatic property to the particle and stably obtain an excellent image having a sufficient contrast, in a dry-type image display device wherein the particle is flown and moved.

As a result of the inventor's dedicated investigation, it is found that it is possible to obtain the particle having an excellent electrostatic property and achieving a decrease of the drive voltage by arranging a micro-irregularity on a surface of the particle, and, that it is possible to obtain stably the excellent image having a sufficient contrast since an incident light looks like a white color when viewing due to its irregular reflection, and the present invention is realized.

That is, the present invention provides the following particles and device for the image display.
1. Particles for image displaying used in an image display device, in which one or more kind of particles is sealed between opposed substrates, at least one substrate being transparent, and, in which the particles are made to fly and move so as to display an image, characterized in that each particle has a micro-irregularity at its surface.
2. The particles for image displaying according to the above 1, wherein a product of a specific surface area S ($m^2/g$) and an average particle diameter d(0.5) (μm) of the particles: (S×d(0.5)) is 10 or more.
3. The particles for image display according to the above 1 or 2, wherein the average particle diameter d(0.5) is in the range of 0.1-50 μm.
4. The particles for image displaying according to one of the above 1-3, wherein the particles is produced by including a volatile component in an inner portion of the each particle at polymerization and removing the volatile component by heating after polymerization.
5. The particles for image displaying according to one of the above 1-3, wherein the particles is produced by crashing or sliding a substance having a high stiffness with respect to the surface of polymerized particles so as to form the micro-irregularity on the surface of the each particle.
6. The particles for image displaying according to one of the above 1-3, wherein the particles are produced by arranging a polymerized portion having an indefinite shape on the surface of the polymerized particles obtained by a suspension polymerization, by means of a graft polymerization method.
7. The particles for image displaying according to one of the above 1-3, wherein the particle is produced by adhering small child particles on the surface of large mother particles.
8. An image display device, in which one or more kind of particles are sealed between opposed substrates, at least one substrate being transparent, and, in which the particles, to which an electrostatic field produced by two kinds of electrodes having different potentials is applied, are made to fly and move so as to display an image, characterized in that use is made of particles having a micro-irregularity at their surfaces.

BEST MODE FOR CARRYING OUT THE INVENTION

In an image display device according to the invention, one or more kind of particles are sealed between opposed substrates, at least one substrate being transparent, and the particles are made to fly and move by means of Coulomb's force and so on so as to display an image.

Figure 1:
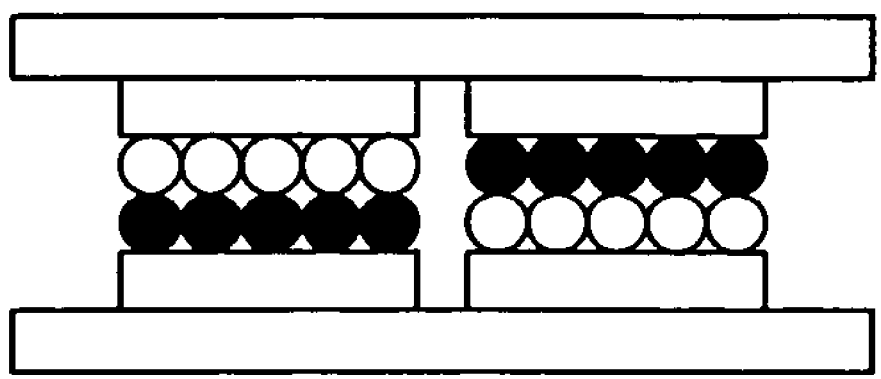
FIG. 1 is a schematic view explaining one embodiment of a display method in an image display device according to the invention.
Figure 1:
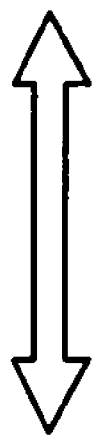
Figure 1:
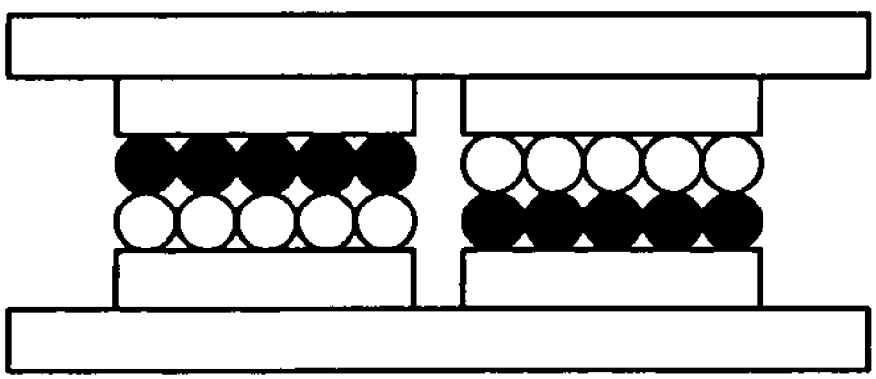
Figure 2:
FIG. 2 is a schematic view explaining another embodiment of a display method in an image display device according to the invention.
Figure 2:
Figure 2:
Figure 2:
Figure 2:
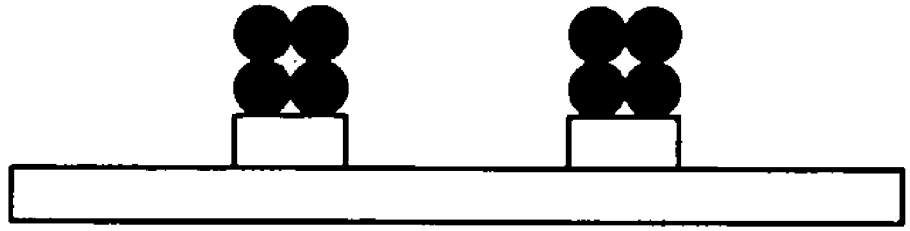

The dry-type image display device mentioned above can be applied to a display method wherein the different particles having two or more colors are moved in a vertical direction with respect to the substrate as shown in FIG. 1 and a display method wherein the powders having one color are moved in a horizontal direction with respect to the substrate as shown in FIG. 2. For the sake of safety, the former display method is preferred.

Figure 3:
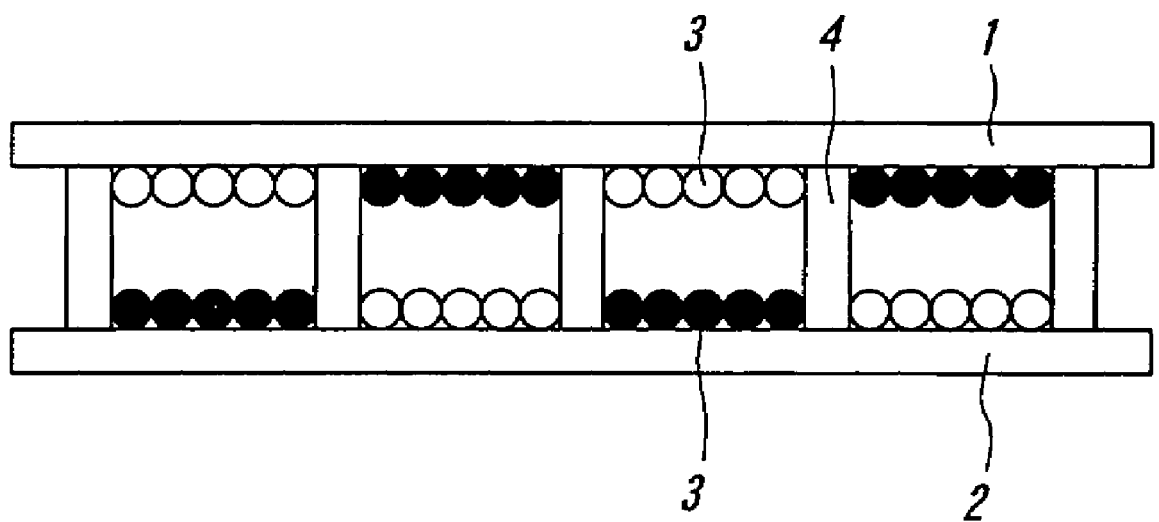
FIG. 3 is a schematic view explaining a structure of an image display device according to the invention.

FIG. 3 is a schematic view explaining a structure of the image display device. In the embodiment shown in FIG. 3, the image display device comprises opposed substrate 1 and substrate 2 and particles 3, and partition walls 4 are arranged according to need.

As to the substrate, at least one of the substrate 1 and 2 is a transparent substrate through which a color of the particles can be observed from outside of the device, and it is preferred to use a material having the high transmission factor of visible light and an excellent heat resistance.

As the image display device, whether flexibility is necessary or not is suitably selected in accordance with its use. For example, it is preferred to use a material having flexibility for the use of electronic-paper and so on, and it is preferred to use a material having no flexibility for the use of a display of portable device such as mobile phone, PDA, laptop computer and so on.

Examples of the substrate material include polymer sheets such as polyethylene terephthalate, polyether sulfone, polyethylene, or polycarbonate, and inorganic sheets such as glass, quartz or so.

The thickness of the substrate is preferably 2 to 5000 μm, more preferably 5 to 1000 μm. When the thickness is too thin, it becomes difficult to maintain strength and distance uniformity between the substrates, and when the thickness is too thick, vividness and contrast as a display capability degrade, and in particular, flexibility in the case of using for an electronic-paper deteriorates.

In the image display device according to the invention, an electrode may be arranged on the substrate according to need.

In the case of arranging no electrode on the substrate, the each particle charged in a predetermined characteristic and having a color is pulled in or rebounds with respect to the substrate by means of an electric field generated by applying an electrostatic latent image on an outer surface of the substrate. Then, the particle aligned in accordance with the electrostatic latent image is observed from outside of the display device through the transparent substrate. In this case, the electrostatic latent image mentioned above can be generated for example by a method wherein an electrostatic latent image generated in a known electrophotography system using an electrophotography photo-conductor is transferred and formed on the substrate of the image display device according to the invention, or, by a method wherein an electrostatic latent image is directly formed on the substrate by an ion flow.

In the case of arranging an electrode on the substrate, the powder charged in a predetermined characteristic and having a color is pulled in or rebounds with respect to the substrate by means of an electric field generated on respective electrodes formed on the substrate by applying an outer voltage thereto. Then, the powder aligned in accordance with the electrostatic latent image is observed from outside of the display device through the transparent substrate.

In this case, the electrode may be formed of electroconductive materials which are transparent and having pattern formation capability. As such electroconductive materials, metals such as aluminum, silver, nickel, copper, and gold, or transparent electroconductive metal oxides such as ITO, electroconductive tin oxide, and electroconductive zinc oxide formed in the shape of thin film by sputtering method, vacuum vapor deposition method, CVD (Chemical Vapor Deposition) method, and coating method, or coated materials obtained by applying the mixed solution of an electroconductive agent with a solvent or a synthetic resin binder are used.

Typical examples of the electroconductive materials include cationic polyelectrolyte such as benzyltrimethylammonium chloride, tetrabutylammonium perchlorate, and so on, anionic polyelectrolyte such as polystyrenesulfonate, polyacrylate, and so on, or electroconductive fine powders of zinc oxide, tin oxide, or indium oxide. Additionally, the thickness of the electrode may be suitable unless the electroconductivity is absent or any hindrance exists in optical transparency, and it is preferable to be 3 to 1000 nm, more preferable to be 5 to 400 nm. The foregoing transparent electrode materials can be employed as the opposed electrode, however, non-transparent electrode materials such as aluminum, silver, nickel, copper, and gold can be also employed.

In this case, the applied outer voltage may be superimposed with a direct current or an alternate current.

It is preferred that an insulation coating layer is formed on the electrode so as not to reduce charges of the charged particles. It is particularly preferred to form this coating layer by a resin having positive electrostatic property for the negatively charged particles and by a resin having negative electrostatic property for the positively charged particles, since the charges of the particles are difficult to be reduced.

As to partition walls, it is preferable to form partition walls around each display element. The partition walls may be formed in two parallel directions. By this structure, unnecessary particles movement in the direction parallel with the substrate is prevented. Further, durability, repeatability and memory retention are assisted. At the same time, the distance between the substrates is made uniform as reinforcing the strength of an image display panel.

The formation method of the partition walls is not particularly restricted, however, a screen printing method wherein pastes are overlapped by coating repeatedly on a predetermined position by screen plate; a sandblast method wherein partition materials are painted with a desired thickness entirely over the substrate and then after coating resist pattern on the partition materials which is wanted to be left as a partition, jetting abrasive to cut and remove partition materials aside from the partition part; lift-off method (additive method) wherein a resist pattern is formed on the substrate using photopolymer, and then after burying paste into a resist recess, removing the resist; photosensitive paste method wherein the photosensitive resin composition containing the partition materials is applied over the substrate and then obtaining a desired pattern by exposure & developing; and mold formation method wherein paste containing the partition materials is applied over the substrate and then forming a partition by compression bonding & pressure forming the dies having rugged structure; and so on are adopted. Further, modifying the mold formation method, relief embossing method wherein a relief pattern provided by a photopolymer composition is used as a mold is also adopted.

As to the particles, it is preferred to use spherical particles due to its fluidity.

The average particle diameter d(0.5) is preferable to be 0.1 to 50 μm, particularly to be 1 to 30 μm. When the average particle diameter is less than this range, charge density of the particles will be so large that an imaging force to an electrode and a substrate becomes too strong; resulting in poor following ability at the inversion of its electric field, although the memory characteristic is favorable. On the contrary, when the average particle diameter exceeds this range, the following ability is favorable, but the memory characteristic will degrade.

Although the method for charging the particles negatively or positively is not particularly limited, a corona discharge method, an electrode injection-charge method, a friction charge method and so on are employable.

It is preferable that the absolute value of the difference between the surface charge densities of the particles, which are measured by a blow-off method using a carrier, is 5-150 μC/g as the absolute value. When the absolute value of the surface charge density is less than this range, response speed to the change of an electric field will be late, and the memory property degrades. When the absolute value of the surface charge density exceeds this range, image force for the electrode or the substrate will be so strong that the memory property will be favorable, but following ability will be poor in the case where the electric field is inverted.

Because it is necessary for the particles to hold the charged electric charge, insulating particles with the volume specific resistance of $1\times10^{10}$ Ω·cm or greater are preferable, and in particular, insulating particles with the volume specific resistance of $1\times10^{12}$ Ω·cm or greater are more preferable.

In the image display device in which the particles are flown and moved by Coulomb's force etc. so as to display the image as mentioned above, the feature of the invention is to use the particles for the image display having micro-irregularity on their surfaces. Since the micro-irregularity is arranged on the surface of the each particle, the following properties can be obtained.

(As to Drive Voltage)

As a large factor for applying influence to the drive voltage, there are an intermolecular force between the particle and the electrode plate and a liquid bridging force. If the micro-irregularity is arranged on a surface of the particle, these adhesion forces are largely decreased, and the drive voltage can be lowered.

(As to Charge Amount of Particles)

If the micro-irregularity is arranged on the surface of the each particle, a specific surface area per single particle can be increased. Therefore, chargeable sites are increased, and thus it is possible to obtain the particle having a sufficient electrostatic property. Moreover, the micro-irregularity causes a charge concentration at its portion, and thus it is possible to obtain the each particle having a more sufficient electrostatic property.

(As to Whiteness)

If the micro-irregularity is arranged on the surface of the each particle, an incident light causes a irregular reflection, and thus the particle shows a white color when viewing.

In the present invention, a specific surface area per each particle is increased by arranging the micro-irregularity on the surface of the each particle, but it is preferred that a product of a specific surface area S ($m^2$/g) and an average particle diameter d(0.5) (μm) of the particle: (S×d(0.5)) is 10 or more.

The average particle diameter d(0.5) is obtained from the particle diameter distribution and means a value of the particle diameter expressed by μm wherein an amount of the particles having the particle diameter larger than or smaller than this value is 50%.

Here, the particle diameter distribution and the average particle diameter mentioned above can be measured by means of a laser diffraction/scattering method. When a laser light is incident upon the particles to be measured, a light intensity distribution pattern due to a diffraction/scattering light occurs spatially. This light intensity distribution pattern corresponds to the particle size, and thus it is possible to measure the particle diameter and the particle diameter distribution.

In the present invention, it is defined that the average particle diameter and the particle diameter distribution are obtained by a volume standard distribution. Specifically, the average particle diameter and the particle diameter distribution can be measured by means of a measuring apparatus Mastersizer 2000 (Malvern Instruments Ltd.) wherein the particles setting in a nitrogen gas flow are calculated by an installed analysis software (which is based on a volume standard distribution due to Mie's theory).

The method for arranging the micro-irregularity on the surface of the each particle is not particularly limited, and, for example, the following methods can be used.

1) Porous particles are produced by including a volatile component in an inner portion of the particles at polymerization and removing the volatile component by heating after polymerization. In this manner, it is possible to arrange the micro-irregularity on each surface of the particles.

Specifically, a solvent having a boiling point higher than a reaction temperature at suspension polymerization such as toluene and xylene is included in an oil spot at polymerization, and the volatile component is removed by heating after polymerization, so as to obtain the porous particles.

2) The micro-irregularity is formed on each surface of the particles by crashing or sliding a substance having a high stiffness with respect to each surface of polymerized particles.

Specifically, use is made of a sandblast method or a method wherein the polymerizes particle is filled in a vessel together with a metal powder and so on, which is further shaken by means of a paint-shaker, and after that only the polymerized particles are picked up by means of a sieve, so as to obtain the particles having the micro-irregularity on their surfaces.

3) The polymerized portion having an indefinite shape is arranged on each surface of polymerized particles obtained by a suspension polymerization by means of a graft polymerization method.

For example, as described in Japanese Patent Laid-Open Publication No. 8-114947, it is possible to obtain the particles having the micro-irregularity by polymerizing a monomer on each surface of main particles under a water system including the main particles, a polymerizable monomer, a dispersant having a skeleton of the polymerizable monomer and a soluble initiator.

4) The surface area is enlarged by adhering small child particles on mother particles.

This treatment is performed by adding the child particles in a solution obtained by dissolving the charge control agent into the solvent, separating the child particles by means of a filtration and drying the filtered child particles.

As the child particles, use is made of minute particles of metal oxide such as silica, titanium oxide. If a surface treatment is performed with respect to the minute particles by using the charge control agent, the charge control agent is fixed to each surface of the minute particles to show a white color, and it is possible to charge the particles in a desired property.

The charge control agent used for adhering the child particles on each surface of the mother particles is not limited if it is soluble in a solvent and its charge can be controlled, and thus any charge control agent available in the market may be preferably used.

For example, use is made of nigrosine compound, resin acid modified azine, resin acid modified azine compound, the fourth grade ammonium salt, salicylic acid metal complex, phenol condensate, metal-containing azo dye, and triphenylmethane derivative.

Moreover, it is possible to control dyeing to a black color or an eggplant color at the same time of the charge control operation by selecting the charge control agent to be used, and thus the minute particles for display having a black color can be obtained.

That is, among the above charge control agents, it is possible to dye the particle by using a solution in which nigrosine compound, resin acid modified azine, resin acid modified azine compound, or metal-containing azo dye is dissolved.

Specifically, use is made of negative charge control agent such as salicylic acid metal complex, metal-containing azo dye, oil-soluble dye of metal-containing (containing a metal ion or a metal atom), the fourth grade ammonium salt-based compound, calixarene compound, boron-containing compound (benzyl acid boron complex), and nitroimidazole derivative. Moreover, use is made of positive charge control agent include nigrosine dye, triphenylmethane compound, the fourth grade ammonium salt compound, polyamine resin, imidazole derivatives, etc.

Additionally, as the charge control agent, use is made of nitrogen-containing circular compound such as pyridine, and so on, and these derivates or salts; and resins containing various organic pigments, fluorine, chlorine, nitrogen, etc.

As the solvent, use is made of any solvent if it dissolves the charge control agent and shows no expansion and no dissolution of the minute particles, and normally it is preferred to use alcohol.

The treatment method is performed by adding 0.1-10% of the charge control agnet in the solvent, and agitating and dissolving them by means of a mixer and so on. The thus obtained solvent is subjected to a filtration so as to remove an undissolved component, and the minute particles is added in the filtered solvent which is further agitated by means of the mixer and so on. The minute particles treated by the filtration is picked up from the mixed solution and the picked-up minute particles is dried, so that the particle for the image display can be obtained.

The charge control agent and coloring agent can be used at the same time. As for a coloring agent, various kinds of organic or inorganic pigments or dye as will be described below are employable.

Examples of black pigments include carbon black, copper oxide, manganese dioxide, aniline black, and activate carbon.

Examples of yellow pigments include chrome yellow, zinc chromate, cadmium yellow, yellow iron oxide, mineral first yellow, nickel titanium yellow, navel orange yellow, naphthol yellow S, hanzayellow G, hanzayellow 10G, benzidine yellow G, benzidine yellow GR, quinoline yellow lake, permanent yellow NCG, and tartrazinelake.

Examples of orange pigments include red chrome yellow, molybdenum orange, permanent orange GTR, pyrazolone orange, Balkan orange, Indanthrene brilliant orange RK, benzidine orange G, and Indanthrene brilliant orange GK.

Examples of red pigments include red oxide, cadmium red, diachylon, mercury sulfide, cadmium, permanent red 4R, lithol red, pyrazolone red, watching red, calcium salt, lake red D, brilliant carmine 6B, eosin lake, rhodamine lake B, alizarin lake, and brilliant carmine 3B.

Examples of purple pigments include manganese purple, first violet B, and methyl violet lake.

Examples of blue pigments include Berlin blue, cobalt blue, alkali blue lake, Victoria blue lake, phthalocyanine blue, metal-free phthalocyanine blue, partially chlorinated phthalocyanine blue, first sky blue, and Indanthrene blue BC.

Examples of green pigments include chrome green, chromium oxide, pigment green B, Malachite green lake, and final yellow green G.

Examples of extenders include baryta powder, barium carbonate, clay, silica, white carbon, talc, and alumina white. Furthermore, there are Nigrosine, Methylene Blue, rose bengal, quinoline yellow, and ultramarine blue as various dyes such as basic dye, acidic dye, dispersion dye, direct dye, etc. These coloring agents may be used alone or in combination of two or more kinds thereof.

The thus surface-treated minute particles (child particles) are fixed to the each mother particle as a core, and the electrostatic property applying and the coloring can be performed.

As the fixing method, use may be made of a wet-type treatment method in which the child particles are coated on each surface of the mother particles together with binder resin. However, in this wet-type treatment method, it is necessary to select the solvent so as to prevent a re-dissolving of the charge control agent. Therefore, it is preferred to fix the child particles to the each mother particle by using a dry-type treatment method from the viewpoint of simplicity.

As a device for the dry-type treatment, Hybridizer (Nara Machinery Co., Ltd.) and MechanoFusion (Hosokawa Micron Co., Ltd.) are well known. They are different type, but they are preferably used.

It is preferred to set the ratio ($d_1/d_2$) between the average particle diameter $d_1$ of the mother particles and the average particle diameter $d_2$ of the child particles to 10 or more. The ratio $d_1/d_2$ is normally 100 or less. If the ratio $d_1/d_2$ is less than 10 (that is, $d_2$ is larger), the number of the child particles to be fixed becomes smaller, and thus it is not possible to obtain the effects of the present invention.

The mother particles may be preferably a circular shape and can be produced by performing the polymerization from monomer. Moreover, according to need, a classifying operation is performed for controlling the particle size. Further, in addition to this, the particle can be obtained by crashing and classifying the resin.

Typical examples of the resin include urethane resin, urea resin, acrylic resin, polyester resin, acryl urethane resin, acryl urethane silicone resin, acryl urethane fluorocarbon polymers, acryl fluorocarbon polymers, silicone resin, acryl silicone resin, epoxy resin, polystyrene resin, styrene acrylic resin, polyolefin resin, butyral resin, vinylidene chloride resin, melamine resin, phenolic resin, fluorocarbon polymers, polycarbonate resin, polysulfon resin, polyether resin, and polyamide resin. For the purpose of controlling the attaching force with the substrate, acryl urethane resin, acryl silicone resin, acryl fluorocarbon polymers, acryl urethane silicone resin, acryl urethane fluorocarbon polymers, fluorocarbon polymers, silicone resin are particularly preferable. Two kinds or more of these may be mixed and used.

The distance between the transparent substrate and the opposed substrate is suitably adjusted in a manner where the particles can move and maintain the contrast of image display; however, it is adjusted usually within 10 to 5000 μm, preferably within 30 to 500 μm.

The volume population of the particles existing in the space between the faced substrates is preferable to be 10 to 80%, more preferable to be 10 to 70%.

The image display device according to the invention is applicable to the image display unit for mobile equipments such as notebook personal computers, PDAs, cellular phones and so on; to the electric-paper for electric book, electric-newspaper and so on; to the bulletin boards such as signboards, posters, blackboards and so on; and to the image display unit for electric calculator, home electric application products, auto supplies and so on.

Then, the present invention will be explained in detail with reference to the examples. However, the present invention is not limited to the following examples.

In the following example and comparative example, measurements of the average particle diameter d(0.5) and the surface charge density were performed as follows.

(1) Average Particle Diameter d(0.5) (μm)

Respective particle was set in an apparatus for measuring a particle diameter distribution (Mastersizer2000, Malvern instruments Ltd.), and the particle diameter distribution was measured. Then, by using the attached analysis software, the average particle diameter d(0.5) (μm), which was a value of the particle diameter expressed by μm wherein an amount of the particles having the particle diameter larger than or smaller than this value was 50%, was determined.

(2) Specific Surface Area S ($m^2/g$)

It was measured according to BET method.

(3) Surface Charge Density

<Blow-Off Measuring Theory and Method>

In the blow-off method, a mixture of the particles and the carriers are placed into a cylindrical container with nets at both ends, and high-pressure gas is blown from the one end to separate the particles and the carriers, and then only the particles are blew off from the mesh of the net. In this occasion, charge amount of reverse polarity remains on the carriers with the same charge amount of the particles carried away out of the container. Then, all of electric flux by this electric charge are collected to Faraday cage, and are charged across a capacitor with this amount. Accordingly, the charge amount of the particles is determined as $Q=CV$ (C: capacity, V: voltage across both ends of the capacitor) by measuring potential of both ends of the capacitor.

As a blow-off powder charge amount measuring instrument, TB-200 produced by Toshiba Chemical Co., Ltd. was used. Two kinds of positively chargeable and negatively chargeable carrier-particles were employed as the carriers, and charge density per unit area (unit: $\mu C/m^2$) was measured in each case. Namely, F963-2535 available from Powder TEC Co., Ltd. was employed as a positive chargeable carrier-particle (the carrier whose opponent is positively charged and itself tends to be negative) and F921-2535 available from Powder TEC Co., Ltd. was employed as negatively chargeable carrier-particle (the carrier whose opponent is negatively charged and itself tends to be positive). The surface charge density of the particles was obtained from the measured charge amount, the average particle diameter and specific gravity of the particles measured separately.

<Particle Specific Gravity Measuring Method>

The specific gravity was measured with the use of a hydrometer produced by Shimadzu Seisakusho Ltd. (brand name: Multi volume Density Meter H1305).

(4) Estimation of Display Function

The black/white display was repeated by repeatedly inversing a potential of 500 V applied to the assembled display device. The estimation of the display function was performed by measuring displays of white color and black color by using a reflection image densitometer (RD918, Macbeth Co., Ltd.). In this case, a contrast ration means a ratio of a reflection density when the black color display was performed with respect to the reflection density when the white color display was performed (=reflection density at black color display/reflection density at white color display).

In this case, unevenness at overall surface display was determined on the basis of the following standard.

○: Overall surface showed black color/white color at substantially 100%.

Δ: In the black display, slight white color portion was included partly, or, in the white display, slight black color portion was included partly.

x: Black color/white color display was mixed considerably.

Moreover, a white color visibility was determined on the basis of the following standard.

○: Contrast of black color/white color was sufficient, and fine patterns could be recognized sufficiently.

Δ: Contrast of black color/white color was slightly insufficient, but fine patterns could be recognized in any case.

x: Pattern recognition was difficult since contrast of black color/white color was insufficient.

EXAMPLE 1

As white color particles, use was made of particles in which 0.2 wt % of hydrophobic silica (H3004, Hoechst Japan Ltd.) was added in a porous polymethyl methacrylate particles (MBP8, SEKISUI PLASTICS CO., LTD, the average particle diameter d(0.5) of 6.1 μm).

As black color particles, use was made of a circular polymethyl methacrylate particles (Techpolymer MBX-5B, SEKISUI PLASTICS CO., LTD., the average particle diameter d(0.5) of 5.6 μm).

The display device was produced as follows. That is, a pair of glass substrates, on which indium oxide electrode having a thickness of about 500 Å (thickness: 50 nm), was assembled in such a manner that an interval between the substrates was controlled to be 100 μm by using spacers. Then, the white color particles and the black color particles mentioned above were filled in the space between the glass substrates, and peripheral portions of the glass substrates were connected by epoxy adhesive, so that the display device was produced. It should be noted that the mixing rate of the white color particles and the black color particles was controlled to be even, and the filling rate of theses particles between the glass substrates was controlled to be 50 vol %. The estimation results of the particles properties and the display functions are shown in Table 1.

COMPARATIVE EXAMPLE 1

The image display device was produced in the same manner as that of the example 1, except that a circular polymethyl the methacrylate particle (MBX8, SEKISUI PLASTICS CO., LTD., the average particle diameter d(0.5) of 5.6 μm) was used as the white color particles instead of the porous polymethyl methacrylate particles (MBP8, SEKISUI PLASTICS CO., LTD., the average particle diameter d(0.5) of 6.1 μm). The estimation results of the particles properties and the display functions are shown in Table 1.

TABLE 1

|  | Example 1 | Comparative Example 1 |
|---|---|---|
| (White particles) | | |
| Material | MBP8 | MBX8 |
| Specific surface area (m$^2$-g) | 85 | 0.8 |
| Average particle diameter d(0.5)(μm) | 6.1 | 5.6 |
| S × d(0.5) | 518.5 | 4.48 |
| Color | White | Clear |
| Surface charge density (μC/m$^2$) (Black particles) | 48 | 33 |
| Material | MBX-5B | MBX-5B |
| Average particle diameter d(0.5)(μm) | 5.6 | 5.6 |
| Estimation of display particles Image displaying | | |
| Overall white displaying (A) | 0.45 | 0.75 |
| Overall black displaying (B) | 1.4 | 1.4 |
| Contrast ratio (B/A) | 3.1 | 1.9 |
| Unevenness at overall displaying | ○ | ○ |
| White color visibility | ○ | X |

INDUSTRIAL APPLICABILITY

The present invention relates to particles for image displaying used in an image display device, in which one or more kind of particles are sealed between opposed substrates, at least one substrate being transparent, and, in which the particles are made to fly and move so as to display an image, characterized in that each particle has a micro-irregularity at its surface. In this invention, since the particle for the image display mentioned above is used, it is possible to obtain the image, which can achieve a low electrostatic property, sufficiently apply an electrostatic property to the particles and stably obtain an excellent image having a sufficient contrast.

The invention claimed is:

1. Particles for image displaying used in an image display device, comprising particles sealed between opposed substrates, at least one of said opposed substrate being transparent, and, in which the particles are made to fly and move so as to display an image, characterized in that each particle has a micro-irregularity at its surface,
   wherein a product of a specific surface area S (m$^2$/g) and an average particle diameter d(0.5) (μm) of the particles: (S×d(0.5)) is 10 or more.

2. The particles for image displaying according to claim 1, wherein the average particle diameter d(0.5) is in the range of 0.1-50 μm.

3. The particles for image displaying according to claim 1, wherein the particles are produced by including a volatile component in an inner portion of the particle at polymerization and removing the volatile component by heating after polymerization.

4. The particles for image displaying according to claim 1, wherein the particles are produced by crashing or sliding a substance having a high stiffness with respect to each surface of polymerized particles so as to form the micro-irregularity on the surface of the each particle.

5. The particles for image displaying according to claim 1, wherein the particles are produced by arranging a polymerized portion having an indefinite shape on each surface of polymerized particles obtained by a suspension polymerization, by means of a graft polymerization method.

6. The particles for image displaying according to claim 1, wherein the particles are produced by adhering small child particles on each surface of large mother particles.

7. An image display device, in which one or more kind of particles are sealed between opposed substrates, at least one substrate being transparent, and, in which the particles, to which an electrostatic field produced by two kinds of electrodes having different potentials is applied, are made to fly and move so as to display an image, characterized in that use is made of each particle having a micro-irregularity at its surface, wherein a product of a specific surface area S ($m^2$/g) and an average particle diameter d(0.5) ($\mu$m) of the particles: (S×d(0.5)) is 10 or more.

8. An image display device comprising:
two opposed substrates;
particles, which are sealed between said opposed substrates;
wherein said particles are configured to move so as to display an image;
wherein at least one of said two opposed substrates is substantially transparent;
wherein a surface of each of said particles has a micro-irregularity; and
wherein a product of a specific surface area S ($m^2$/g) and an average particle diameter d(0.5) ($\mu$m) of said particles: (S×d(0.5)) is 10 or more.

* * * * *